United States Patent Office 3,296,940
Patented Jan. 10, 1967

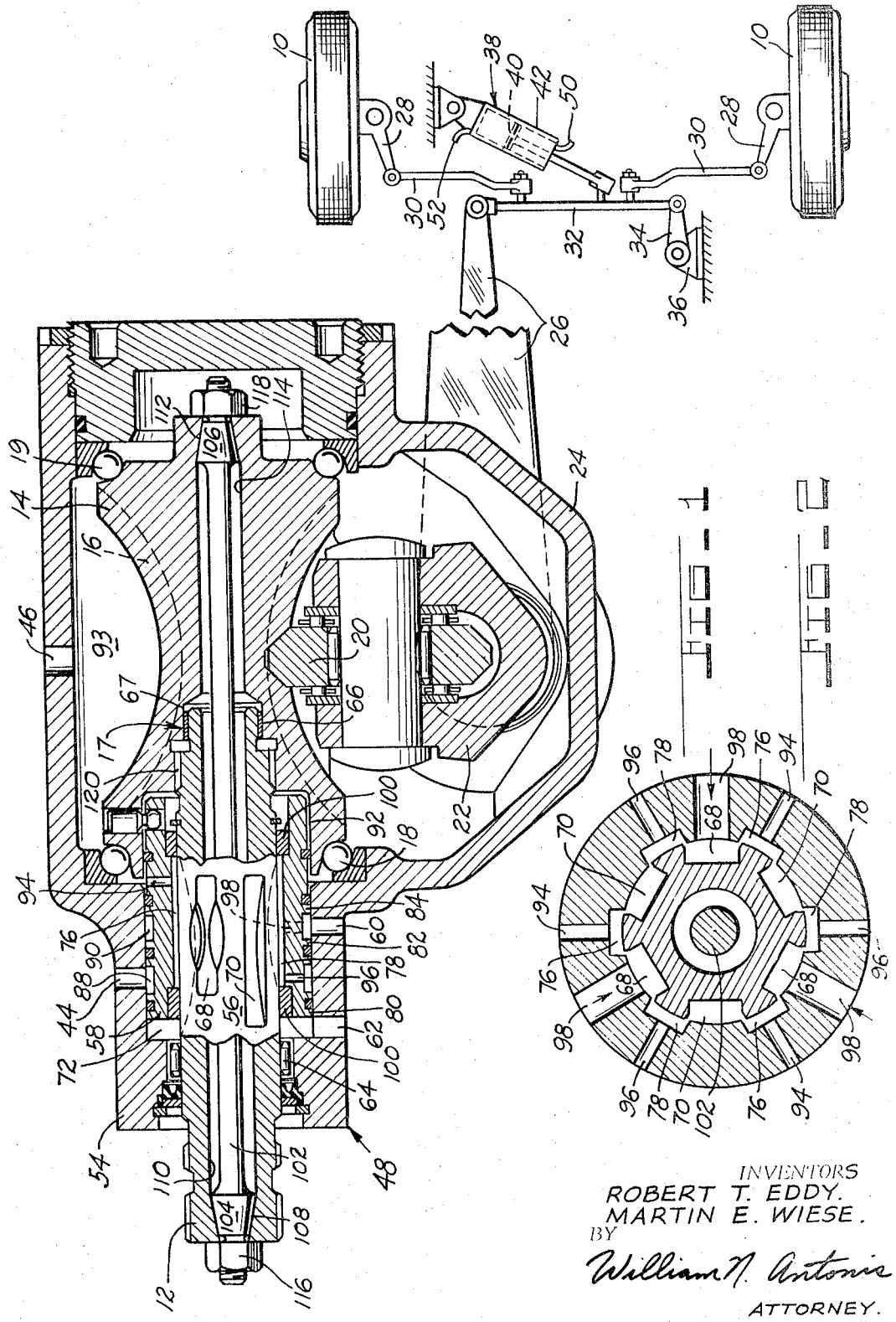

3,296,940
POWER STEERING MECHANISM
Robert T. Eddy and Martin E. Wiese, South Bend, Ind., assignors to The Bendix Corporation, South Bend, Ind., a corporation of Delaware
Filed Nov. 30, 1964, Ser. No. 414,557
4 Claims. (Cl. 91—375)

This invention relates to power steering and more particularly to a torsion bar locking and sealing arrangement for a power steering mechanism of the type shown in Vickers et al. Patent No. 3,145,626.

An object of this invention is to provide a power steering mechanism of the foregoing type which includes means for locking the torsion bar to its mating members so as to permit field replacement of any damaged input parts.

Another object of this invention is to provide a torsion bar locking arrangement for a power steering mechanism of the foregoing type, which eliminates the necessity for torsion bar seals.

A further object of this invention is to provide a torsion bar locking arrangement for a power steering mechanism of the foregoing type, which permits trimming of the power steering valve and thereby eliminates the necessity for devices such as eccentric trim pins.

More specifically, it is an object of this invention to provide a torsion bar for a power steering mechanism of the foregoing type wherein said torsion bar has oppositely disposed self-locking conical tapers formed thereon which sealingly engage matching conical tapers formed in the bores of the steering worm and input member and permit these three members to be locked together.

The above and other objects and features of this invention will be apparent from the following description of the mechanism taken in connection with the accompanying drawing which forms a part of this specification and in which:

FIGURE 1 is a view partially in section of a power steering mechanism constructed in accordance with the present invention, which is shown in association with parts of the vehicle drawn schematically; and FIGURE 2 is a composite sectional view which shows the passages of the power steering valve moved into the same plane for purposes of more clearly illustrating the flow paths within the valve.

Referring to FIGURE 1, it will be seen that reference numeral 10 designates the front wheels of a vehicle to be steered by rotation of the steering shaft (not shown), which is suitably connected to the input shaft 12. Operatively connected to the input shaft 12 is an hourglass worm 14, having a groove type cam track 16 formed thereon and a stepped diameter bore 17 located within and at one end thereof which extends substantially to the bottom of the cam track without interfering therewith, said worm being held against axial displacement by radial thrust bearings 18 and 19 located at each end of the worm. A roller sector gear 20 is arranged to engage the cam track 16 of the worm and is carried by one end of a sector shaft 22 which is suitably journalled in gear housing 24. A pitman arm 26 is connected to the other end of the sector shaft 22 and to the spindle arms 28 of the wheels 10 through a steering linkage assembly, which includes tie rods 30, a cross tie rod 32 and an idler arm 34 suitably pivoted at one end to the vehicle frame 36.

The hydraulic system of the power steering mechanism includes a fluid motor 38, which may be connected between the cross tie rod 32 and the vehicle frame 36, as shown in FIGURE 1. However, the fluid motor may be located at any other suitable position, e.g., integral with the steering gear housing. A piston 40 divides cylinder 42 into opposed chambers constantly communicating respectively with cylinder ports 44 and 46 of rotor valve 48, via conduits 50 and 52.

The main components of the rotary valve 48 are the valve housing 54, the rotor 56 which is formed on the input shaft 12, and the sleeve 58 which is located between the rotor and the valve housing. Located in the housing 54 are inlet port 60, outlet port 62, and the two previously mentioned cylinder ports 44 and 46. It wil be noted that the combination input shaft-valve rotor has one end thereof which rotates on the needle rotor bearings 64 which are located between the input shaft 12 and the valve housing 54, while the other end thereof extends into the bore portion 67 of stepped diameter bore 17 and rotates on a bronze bearing 66 located between the input shaft and the worm 14. The rotor 56 contains six axially extending equally spaced slots formed on the outer periphery thereof, three of which are pressure slots and are designated by the reference numeral 68, and the other three of which are return slots and are designated by the reference numeral 70. It will be noted that the return slots 70 are longer than the pressure slots 68, so that the return slots may communicate with a return chamber 72 located at one end of sleeve 58.

Located on the inner periphery of valve sleeve 58 are six axially extending equally spaced slots, three of which are designated by the reference numeral 76, and the other three of which are designated by the reference numeral 78. Formed on the outer periphery of valve sleeve 58 are three annular lands 80, 82 and 84 and two annular grooves 88 and 90. Since sleeve 58 extends into the bore portion 92 of stepped diameter bore 17, it is possible to eliminate the fourth annular land and third annular groove, both of which are normally common to rotary valves of this general type, as typified by Davis Patent No. 1,947,-973. In view of the arrangement shown, it is possible to communicate steering gear cavity 93 with sleeve slot 76 via radially extending passages 94 without the necessity for utilizing an annular groove on the valve sleeve, since radially extending passages 94 open directly into the steering gear cavity. On the other hand, radially extending passages 96 communicate sleeve slot 78 with annular groove 88. Radially extending passages 98 communicate rotor slot 68 with annular groove 90. Thus, it can be seen from the drawing, particularly FIGURE 2, that when the rotary valve 48, which is an open center valve, is in a neutral straight ahead position, flow will occur from inlet port 60 to outlet port 62 via annular groove 90, radially extending sleeve passages 98, axially extending rotor slot 68, axially extending sleeve slots 76 and 78, axially extending rotor slots 70, and return chamber 72. Cylinder port 44 communicates with sleeve slot 78 via radial sleeve passages 96 and annular groove 88, whereas cylinder port 46 communicates with sleeve slot 76 via radial passages 94 and steering gear cavity 93.

Seals are located in annular lands 80, 82 and 84 to prevent leakage thereacross. These seals are glass filled Teflon endless sealing rings of rectangular section. Stop-off rings 100 seal off the axially extending sleeve slots 76 and 78 and also serve as bearings.

A torsion bar 102 having oppositely disposed conical tapers 104 and 106 formed thereon, the first of which sealingly engages conical taper 108 formed in the bore 110 of the input member 12 and the second of which sealingly engages conical taper 112 formed in the bore 114 of the worm 14, is locked at one end to the input member 12 through means of a nut 116 threaded thereon and at the other end to the worm through means of a nut 118. Locking of the torsion bar to its mating members is accomplished simply by tightening nut 116 against input member 12 and the nut 118 against the worm 16. This mode of attachment permits field replacement of any damaged input parts, the elimination of torsion bar seals and the elimination of eccentric trim pins.

The three equally spaced flow paths previously described give balanced forces within the valve due to fluid flow, thereby eliminating any stickiness due to hydraulic unbalance. Upon rotation of the steering wheel, the valve rotor 56 is rotated relative to the valve sleeve 58 as a result of deflection of the torsion rod 102 which connects the valve rotor and the steering gear worm. This movement is in proportion to the input torque. As can more clearly be seen by reference to FIGURE 2, relative rotation between valve rotor 56 and valve sleeve 58 will cause one of the cylinder ports 44, 46 to communicate with the inlet port 60 and the other cylinder port to communicate with the outlet port 62. This will create a differential pressure across piston 40 and will result in power assisted steering.

A mechanical drive through spline type connection 120 is provided between the combination input rotor 12, 56 and the worm 14 which will result in a direct mechanical drive between the input shaft and the worm in the event of power failure. At all other times, this connection will permit limited relative rotary motion between the input shaft and the worm. The torsion rod 102, which connects the valve rotor and worm, provides mechanical "feel" without preventing the necessary angular movement required between the sleeve and rotor for valve operation.

The several practical advantages which flow from this novel inventive arrangement are believed to be obvious from the above description and other advantages may suggest themselves to those who are familiar with the art to which the invention relates.

Having thus described the various features of the invention, what we claim as new and desire to secure by Letters Patent is:

1. In a power steering mechanism including an input member having a first bore extending therethrough, said first bore having a conical taper at one end thereof the imaginary base of which is located within said first bore and the imaginary apex of which is located without said first bore, an output member, and a fluid motor operatively connected to said output member, the combination within a housing of a worm having a second bore extending therethrough and groove means formed thereon, said second bore having a conical taper at one end thereof the imaginary base of which is located within said second bore and the imaginary apex of which is located without said second bore, follower means operatively connected to said output member and engaging said groove means, a pair of relatively rotatable telescoped tubular elements through which fluid flow to and from said motor is controlled, one of which is a part of said input member and the other of which is connected to said worm, a torsion bar located in and extending through said first and second bores, said torsion bar having oppositely disposed conical tapers formed thereon, one of which sealingly engages the conical taper in said first bore and the other of which sealingly engages the conical taper in said second bore, and means for locking one end of said torsion bar to said input member and the other end of said torsion bar to said worm, said means being operatively connected to the ends of said torsion bar and located externally of said input member and worm.

2. In a power steering mechanism including an input member having a first bore extending therethrough, said first bore having a conical taper at one end thereof the imaginary base of which is located within said first bore and the imaginary apex of which is located without said first bore, an output member, and a fluid motor operatively connected to said output member, the combination within a housing of a worm having a second bore extending therethrough and groove means formed thereon, said second bore having a conical taper at one end thereof the imaginary base of which is located within said second bore and the imaginary apex of which is located without said second bore, follower means operatively connected to said output member and engaging said groove means, a pair of relatively rotatable telescoped tubular elements through which fluid flow to and from said motor is controlled, one of which is operatively connected to said input member and the other of which is operatively connected to said worm, a torsion bar located in and extending through said first and second bores, said torsion bar having oppositely disposed conical tapers formed thereon, one of which sealingly engages the conical taper in said first bore and the other of which sealingly engages the conical taper in said second bore, and means for urging said conical tapers into said sealing engagement and locking one end of said torsion bar to said input member and the other end of said torsion bar to said worm, said means being operatively connected to the ends of said torsion bar and located externally of said input member and worm.

3. In a power steering mechanism including an input member having a first bore extending therethrough, said first bore having a conical taper at one end thereof the imaginary base of which is located within said first bore and the imaginary apex of which is located without said first bore, an output member, and a fluid motor operatively connected to said output member, the combination within a housing of a worm having a second bore extending therethrough and groove means formed thereon, said second bore being in coaxial alignment with said first bore and having a conical taper at one end thereof the imaginary base of which is located within said second bore and the imaginary apex of which is located without said second bore, follower means operatively connected to said output member and engaging said groove means, a pair of relatively rotatable telescoped tubular elements through which fluid flow to and from said motor is controlled, one of which is said input member and the other of which in a sleeve member located between said input member and said housing, a torsion bar located in and extending through said first and second bores, said torsion bar having oppositely disposed conical tapers formed thereon, one of which sealingly engages the conical taper in said first bore and the other of which sealingly engages the conical taper in said second bore, and means for urging said conical tapers into said sealing engagement and locking one end of said torsion bar to said input member and the other end of said torsion bar to said worm, said means being operatively connected to the ends of said torsion bar and located externally of said input member and worm.

4. The combination, as defined in claim 3, wherein said last named means includes a nut threaded to each end of said torsion bar, one of which abuts said input member and the other of which abuts said worm.

References Cited by the Examiner
UNITED STATES PATENTS

| | | | |
|---|---|---|---|
| 2,640,322 | 6/1953 | Puerner | 91—380 |
| 2,988,059 | 6/1961 | Wysong | 91—380 |
| 3,022,772 | 2/1962 | Zeigler et al. | 91—380 |
| 3,070,072 | 12/1962 | Folkerts | 91—380 |
| 3,162,263 | 12/1964 | Brown | 74—388 |

MARTIN P. SCHWADRON, *Primary Examiner.*

PAUL E. MASLOUSKY, *Examiner.*